(12) United States Patent
Hsu

(10) Patent No.: US 7,828,590 B1
(45) Date of Patent: Nov. 9, 2010

(54) ELECTRONIC DEVICE WITH CONTACT PROBES

(75) Inventor: Chung-Gi Hsu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/732,214

(22) Filed: Mar. 26, 2010

(30) Foreign Application Priority Data

Feb. 5, 2010 (CN) .................... 2010 2 0302418 U

(51) Int. Cl.
    *H01R 3/00* (2006.01)
(52) U.S. Cl. ..................................... 439/500; 439/76.1
(58) Field of Classification Search ................ 439/500
    See application file for complete search history.

(56) References Cited

U.S. PATENT DOCUMENTS

| | | | |
|---|---|---|---|
| 6,227,901 B1 * | 5/2001 | Pupkiewicz et al. | 439/500 |
| 6,554,640 B1 * | 4/2003 | Koike et al. | 439/500 |
| 6,644,984 B2 * | 11/2003 | Vista et al. | 439/76.1 |
| 6,860,743 B2 * | 3/2005 | Ekkul et al. | 439/76.1 |
| 6,945,786 B2 * | 9/2005 | Ammar et al. | 439/65 |
| 7,114,958 B2 * | 10/2006 | Angelucci | 439/65 |
| 2003/0181078 A1 * | 9/2003 | Huang et al. | 439/76.1 |

* cited by examiner

*Primary Examiner*—James Harvey
(74) *Attorney, Agent, or Firm*—Raymond J. Chew

(57) ABSTRACT

An electronic device includes an enclosure, a battery mounted the enclosure to supply power to the electronic device, a printed circuit board (PCB) mounted in the enclosure, at least one electrical connector attached to the PCB, and at least one contact probe. The enclosure includes a pair of sidewalls and at least one receiving hole defined in one of the pair of sidewalls. The electrical connector includes a fixing member including a hook located at a distal end thereof. The contact probe is received in the receiving hole to electrically connect the battery to the PCB, and includes a contact portion including a receiving groove defined at a distal end thereof. The hook is received in the receiving groove to electrically connect the contact probe to the PCB.

5 Claims, 4 Drawing Sheets

ELECTRONIC DEVICE WITH CONTACT PROBES

BACKGROUND

1. Technical Field

The present disclosure relates to electronic devices, and more particularly to an electronic device with contact probes.

2. Description of Related Art

In electronic devices, such as mobile phones, notebooks, personal digital assistants (PDAs), for example, batteries are used to supply power to the electronic devices. A contact probe is used to electrically connect a battery to an electrical connector fixed on a printed circuit board (PCB) of an electronic device. However, there is no structure to retain the contact probe and the electrical connector, resulting in possible disengagement of the contact probe from the electrical connector, and accordingly, disconnection of the battery and PCB.

Therefore, a need exists in the industry to overcome the described limitations.

DETAILED DESCRIPTION

Figure 1:
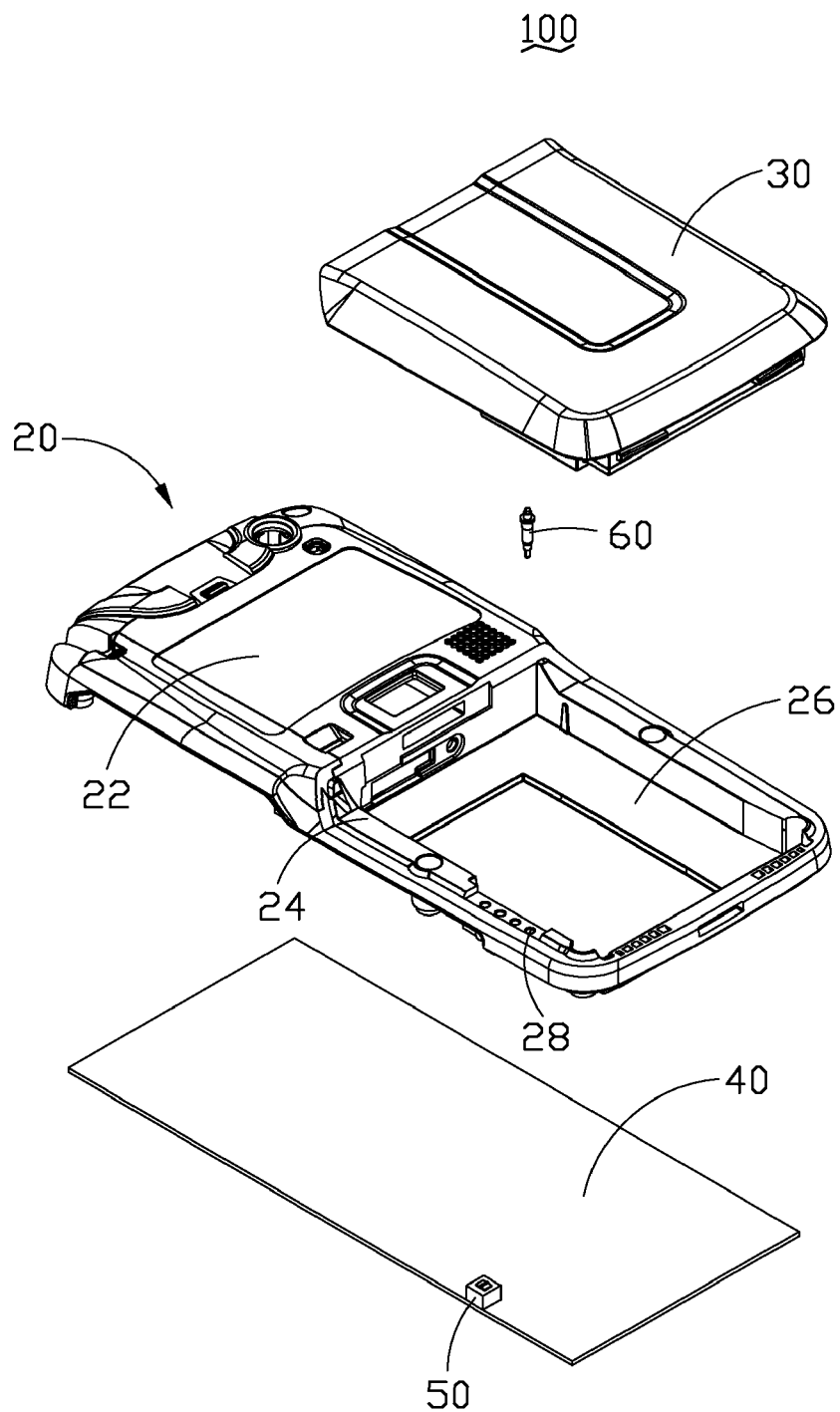
FIG. 1 is an exploded, isometric view of an electronic device of an exemplary embodiment of the disclosure.

Referring to FIG. 1, an electronic device 100 of an exemplary embodiment of the present disclosure is illustrated. The electronic device 100 includes an enclosure 20, a battery 30, a printed circuit board (PCB) 40, a plurality of electrical connectors 50 (one electrical connector 50 shown) fixed on the PCB 40, and a plurality of contact probes 60 (one contact probe 60 shown). The electronic device 100 may be a mobile phone, or a notebook computer, but the disclosure is not limited thereto.

The enclosure 20 accommodates electronic elements, such as, PCBs and a central processing unit (CPU), for example. The enclosure 20 is substantially rectangular and it will be understood that other configurations may be utilized. The enclosure 20 includes a cover (not shown) and a base 22.

The base 22 includes a pair of sidewalls 24, an accommodating space 26 surrounded by the pair of sidewalls 24 to receive the battery 30, a plurality of receiving holes 28 to receive the contact probes 60. In one embodiment, there are four receiving holes 28.

The battery 30 is mounted to the base 22 to supply power to the electronic device 100.

Figure 2:
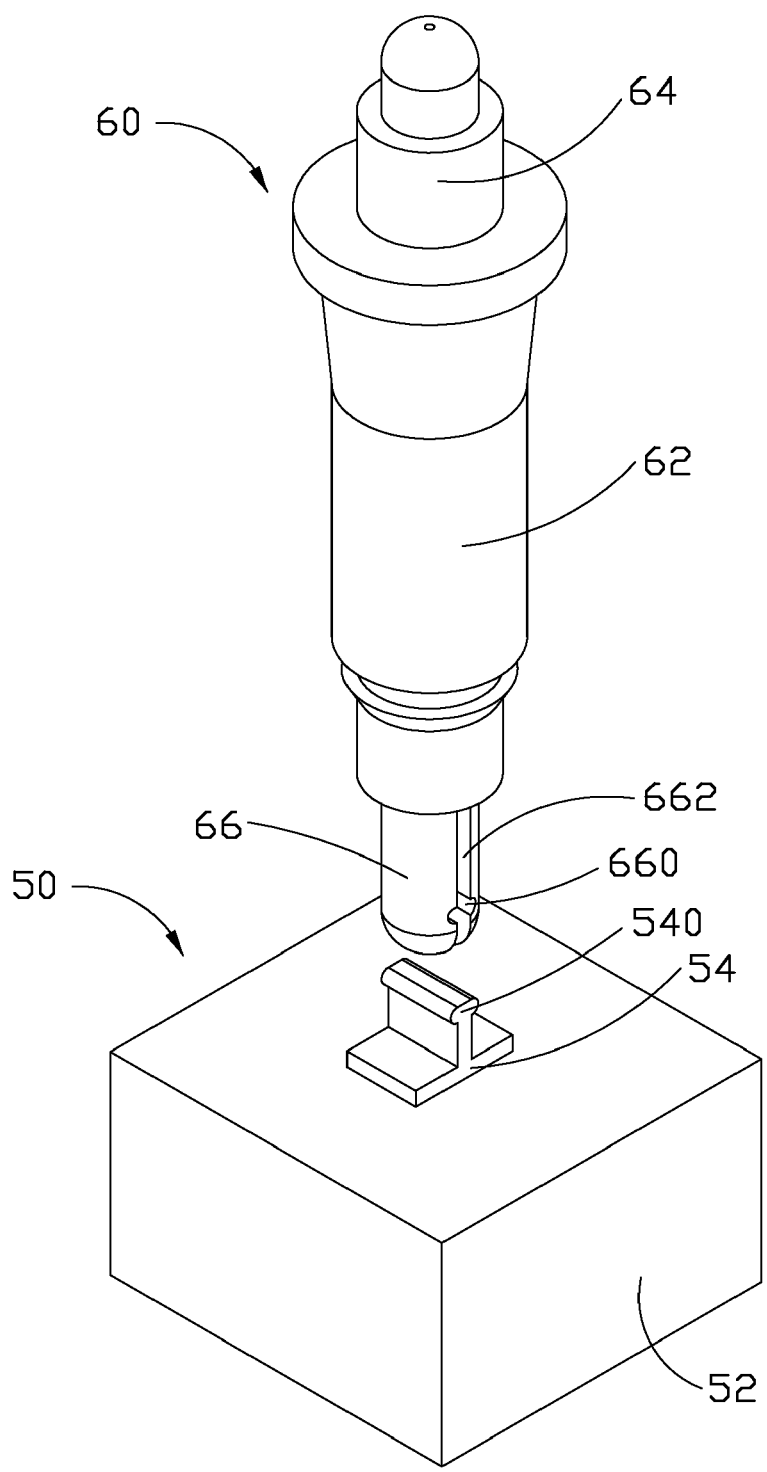
FIG. 2 is an enlarged, exploded, isometric view of a contact probe and an electrical connector of FIG. 1.
Figure 3:
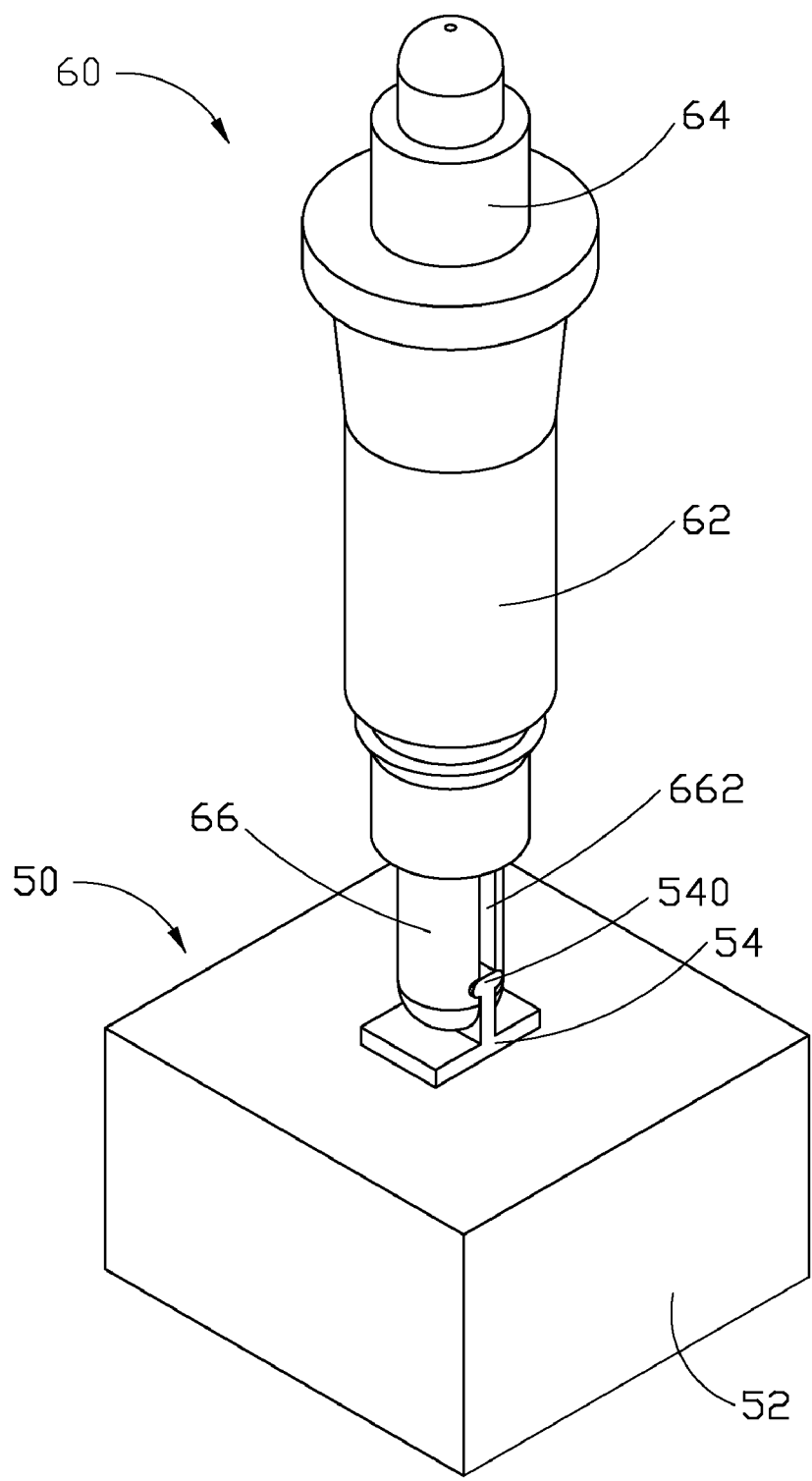
FIG. 3 is an assembled view of FIG. 2.

Referring to FIG. 2 and FIG. 3, the electrical connectors 50 are attached to the PCB 40, and electrically connect the contact probes 60 to the PCB 40. Each of the electrical connectors 50 includes a main body 52 and a conductive fixing member 54 projecting from a middle portion of the main body 52. A cross-section of the fixing member 54 is substantially T-shaped. The fixing member 54 includes a hook 540 located at a distal end thereof.

Each of the contact probes 60 is received in a corresponding receiving hole 28 of the enclosure 20 to electrically connect the battery 30 to the PCB 40. Each of the contact probes 60 includes a barrel 62, a probe head 64 extending out of one end of the barrel 62, and a contact portion 66 extending out of another end of the barrel 62. The contact portion 66 defines a receiving groove 660 at a distal end thereof. The hook 540 of the electrical connector 50 is received in the receiving groove 660 to electrically and mechanically connect the contact probes 60 to the electrical connectors 50. The contact portion 66 further defines a lengthways slot 662 in a middle portion thereof. The slot 662 is in communication with the receiving groove 660, facilitating insertion of the hook 540 into the receiving groove 660.

Figure 4:
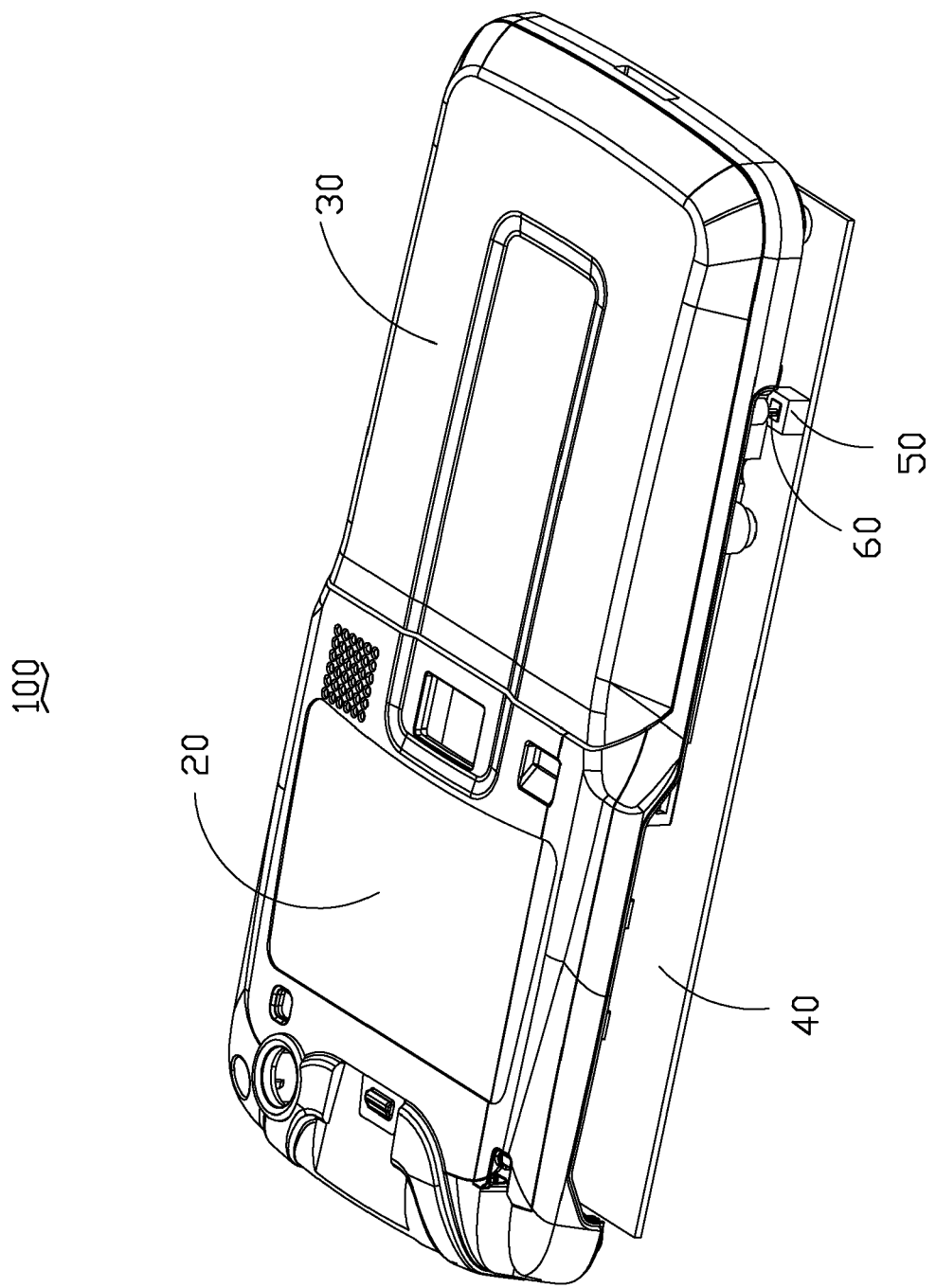
FIG. 4 is an enlarged, assembled view of FIG. 1.

Referring to FIG. 4, in assembly, the PCB 40 and the electrical connectors 50 are mounted in the enclosure 20. The contact probes 60 are received in a corresponding receiving hole 28 with the hook 540 of each electrical connector 50 inserting into the corresponding receiving groove 660. The battery 30 is attached to the base 22 of the enclosure 20. Thus, the enclosure 20, the battery 30, the PCB 40, the electrical connector 50, and the contact probe 60 are assembled into the electronic device 100.

Because the hook 540 is received in the receiving groove 660, disengagement of the contact probe 60 from the electrical connector 50 is avoided during use, accordingly, power to the electronic device 100 is ensured.

While an embodiment of the present disclosure has been described above, it should be understood that it has been presented by way of example only and not by way of limitation. Thus the breadth and scope of the present disclosure should not be limited by the above-described embodiments, but should be defined only in accordance with the following claims and their equivalents.

What is claimed is:

1. An electronic device, comprising:
   an enclosure comprising a pair of sidewalls and at least one receiving hole defined in one of the pair of sidewalls;
   a battery mounted to the enclosure to supply power to the electronic device;
   a printed circuit board (PCB) mounted in the enclosure;
   at least one electrical connector attached to the PCB and comprising a fixing member comprising a hook located at a distal end thereof; and
   at least one contact probe received in the at least one receiving hole to electrically connect the battery to the PCB, the at least one contact probe comprising a contact portion comprising a receiving groove defined at a distal end thereof;
   wherein the hook is received in the receiving groove to electrically connect the at least one contact probe to the PCB.

2. The electronic device as recited in claim 1, wherein the at least one contact probe comprises a barrel and a probe head extending out of one end of the barrel, and wherein the contact portion extends out of another end of the barrel.

3. The electronic device as recited in claim 2, wherein the contact portion defines a lengthways slot in a middle portion thereof, wherein the slot is in communication with the receiving groove.

4. The electronic device as recited in claim 1, wherein the at least one electrical connect comprises a main body, wherein the fixing member projects from a middle portion of the main body.

5. The electronic device as recited in claim 4, wherein a cross-section of the fixing member is substantially T-shaped.

* * * * *